(12) United States Patent
MacVittie

(10) Patent No.: US 9,578,090 B1
(45) Date of Patent: Feb. 21, 2017

(54) METHODS FOR PROVISIONING APPLICATION DELIVERY SERVICE AND DEVICES THEREOF

(71) Applicant: F5 Networks, Inc., Seattle, WA (US)

(72) Inventor: Lori MacVittie, Green Bay, WI (US)

(73) Assignee: F5 Networks, Inc., Seattle, WA (US)

( * ) Notice: Subject to any disclaimer, the term of this patent is extended or adjusted under 35 U.S.C. 154(b) by 376 days.

(21) Appl. No.: 14/074,065

(22) Filed: Nov. 7, 2013

Related U.S. Application Data

(60) Provisional application No. 61/723,617, filed on Nov. 7, 2012.

(51) Int. Cl.
*H04L 29/08* (2006.01)
*G06F 15/16* (2006.01)

(52) U.S. Cl.
CPC ............ *H04L 67/10* (2013.01); *H04L 67/327* (2013.01)

(58) Field of Classification Search
CPC .................................................... H04L 67/327
See application file for complete search history.

(56) References Cited

U.S. PATENT DOCUMENTS

| | | | |
|---|---|---|---|
| 5,282,201 A | 1/1994 | Frank et al. | |
| 5,550,816 A | 8/1996 | Hardwick et al. | |
| 5,606,665 A | 2/1997 | Yang et al. | |
| 5,623,490 A | 4/1997 | Richter et al. | |
| 5,991,302 A | 11/1999 | Berl et al. | |
| 5,995,491 A | 11/1999 | Richter et al. | |
| 6,026,500 A | 2/2000 | Topff et al. | |
| 6,029,175 A | 2/2000 | Chow et al. | |
| 6,041,365 A | 3/2000 | Kleinerman | |
| 6,047,356 A | 4/2000 | Anderson et al. | |
| 6,067,558 A | 5/2000 | Wendt et al. | |
| 6,104,706 A | 8/2000 | Richter et al. | |
| 6,154,777 A | 11/2000 | Ebrahim | |
| 6,157,950 A | 12/2000 | Krishnan | |
| 6,259,405 B1 | 7/2001 | Stewart et al. | |
| 6,260,070 B1 | 7/2001 | Shah | |

(Continued)

FOREIGN PATENT DOCUMENTS

| | | |
|---|---|---|
| CA | 2080530 A1 | 4/1994 |
| EP | 0605088 A3 | 2/1996 |

(Continued)

OTHER PUBLICATIONS

Baer, T., et al., "The elements of Web services" ADTmag.com, Dec. 1, 2002, pp. 1-6, (http://www.adtmag.com).

(Continued)

*Primary Examiner* — Suraj Joshi
(74) *Attorney, Agent, or Firm* — LeClairRyan, a Professional Corporation

(57) ABSTRACT

A method, non-transitory computer readable medium and an application delivery controller for receiving a notification from a client computing device when an application is selected. A configuration file including one or more instructions is identified from one or more memory locations. One or more instructions within the application delivery controller is updated with the one or more instructions present within the identified configuration file to provision the selected application. The selected application is provisioned to the requesting client computing device using the updated one or more instructions.

21 Claims, 3 Drawing Sheets

(56) References Cited

U.S. PATENT DOCUMENTS

| | | |
|---|---|---|
| 6,292,832 B1 | 9/2001 | Shah et al. |
| 6,304,913 B1 | 10/2001 | Rune |
| 6,330,574 B1 | 12/2001 | Murashita |
| 6,338,082 B1 | 1/2002 | Schneider |
| 6,353,848 B1 | 3/2002 | Morris |
| 6,363,056 B1 | 3/2002 | Beigi et al. |
| 6,370,527 B1 | 4/2002 | Singhal |
| 6,389,462 B1 | 5/2002 | Cohen et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,513,061 B1 | 1/2003 | Ebata et al. |
| 6,514,085 B2 | 2/2003 | Slattery et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,615,267 B1 | 9/2003 | Whalen et al. |
| 6,631,422 B1 | 10/2003 | Althaus et al. |
| 6,654,346 B1 | 11/2003 | Mahalingaiah et al. |
| 6,701,415 B1 | 3/2004 | Hendren, III |
| 6,708,220 B1 | 3/2004 | Olin |
| 6,728,704 B2 | 4/2004 | Mao et al. |
| 6,738,357 B1 | 5/2004 | Richter et al. |
| 6,744,776 B1 | 6/2004 | Kalkunte et al. |
| 6,754,215 B1 | 6/2004 | Arikawa et al. |
| 6,754,699 B2 | 6/2004 | Swildens et al. |
| 6,760,337 B1 | 7/2004 | Snyder, II et al. |
| 6,795,860 B1 | 9/2004 | Shah |
| 6,857,009 B1 | 2/2005 | Ferreria |
| 6,862,282 B1 | 3/2005 | Oden |
| 6,865,593 B1 | 3/2005 | Reshef et al. |
| 6,868,447 B1 | 3/2005 | Slaughter et al. |
| 6,871,221 B1 | 3/2005 | Styles |
| 6,880,017 B1 | 4/2005 | Marce et al. |
| 6,883,137 B1 | 4/2005 | Girardot et al. |
| 6,904,040 B2 | 6/2005 | Salapura et al. |
| 6,914,881 B1 | 7/2005 | Mansfield et al. |
| 6,928,518 B2 | 8/2005 | Talagala |
| 6,970,475 B1 | 11/2005 | Fraser et al. |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,502 B2 | 2/2006 | Lin |
| 7,020,713 B1 | 3/2006 | Shah et al. |
| 7,023,974 B1 | 4/2006 | Brannam et al. |
| 7,035,212 B1 | 4/2006 | Mittal et al. |
| 7,039,061 B2 | 5/2006 | Connor et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,996 B2 | 9/2006 | Kronenberg |
| 7,133,863 B2 | 11/2006 | Teng et al. |
| 7,161,904 B2 | 1/2007 | Hussain et al. |
| 7,191,163 B2 | 3/2007 | Herrera et al. |
| 7,228,359 B1 | 6/2007 | Monteiro |
| 7,236,491 B2 | 6/2007 | Tsao et al. |
| 7,240,100 B1 | 7/2007 | Wein et al. |
| 7,257,633 B2 | 8/2007 | Masputra et al. |
| 7,292,541 B1 | 11/2007 | C S |
| 7,296,263 B1 | 11/2007 | Jacob |
| 7,308,475 B1 | 12/2007 | Pruitt et al. |
| 7,324,533 B1 | 1/2008 | DeLiberato et al. |
| 7,340,571 B2 | 3/2008 | Saze |
| 7,373,438 B1 | 5/2008 | DeBergalis et al. |
| 7,409,440 B1 | 8/2008 | Jacob |
| 7,555,608 B2 | 6/2009 | Naik et al. |
| 7,577,723 B2 | 8/2009 | Matsuda et al. |
| 7,640,347 B1 | 12/2009 | Sloat et al. |
| 7,684,423 B2 | 3/2010 | Tripathi et al. |
| 7,698,458 B1 | 4/2010 | Liu et al. |
| 7,822,839 B1 | 10/2010 | Pruitt et al. |
| 7,861,085 B1 | 12/2010 | Case et al. |
| 7,895,653 B2 | 2/2011 | Calo et al. |
| 7,903,554 B1 | 3/2011 | Manur et al. |
| 7,908,245 B2 | 3/2011 | Nakano et al. |
| 7,958,222 B1 | 6/2011 | Pruitt et al. |
| 7,984,500 B1 | 7/2011 | Khanna et al. |
| 8,024,443 B1 | 9/2011 | Jacob |
| 8,037,528 B2 | 10/2011 | Williams et al. |
| 8,064,342 B2 | 11/2011 | Badger |
| 8,069,225 B2 | 11/2011 | McCanne et al. |
| 8,155,128 B2 | 4/2012 | Balyan et al. |
| 8,171,124 B2 | 5/2012 | Kondamuru |
| 8,271,620 B2 | 9/2012 | Witchey |
| 8,396,836 B1 | 3/2013 | Ferguson et al. |
| 8,463,850 B1 | 6/2013 | McCann |
| 8,484,348 B2 | 7/2013 | Subramanian et al. |
| 8,601,000 B1 | 12/2013 | Stefani et al. |
| 8,838,817 B1 | 9/2014 | Biswas |
| 8,879,431 B2 | 11/2014 | Ridel et al. |
| 8,959,215 B2 | 2/2015 | Koponen et al. |
| 9,143,451 B2 | 9/2015 | Amdahl et al. |
| 2001/0007560 A1 | 7/2001 | Masuda et al. |
| 2002/0010757 A1 | 1/2002 | Granik et al. |
| 2002/0012352 A1 | 1/2002 | Hansson et al. |
| 2002/0032758 A1* | 3/2002 | Yen .................. H04L 67/42 709/220 |
| 2002/0038360 A1 | 3/2002 | Andrews et al. |
| 2002/0065848 A1 | 5/2002 | Walker et al. |
| 2002/0072048 A1 | 6/2002 | Slattery et al. |
| 2002/0087571 A1 | 7/2002 | Stapel et al. |
| 2002/0087744 A1 | 7/2002 | Kitchin |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0143819 A1 | 10/2002 | Han et al. |
| 2002/0143852 A1 | 10/2002 | Guo et al. |
| 2002/0162118 A1 | 10/2002 | Levy et al. |
| 2002/0174216 A1 | 11/2002 | Shorey et al. |
| 2002/0194112 A1 | 12/2002 | DePinto et al. |
| 2002/0194342 A1 | 12/2002 | Lu et al. |
| 2002/0198956 A1 | 12/2002 | Dunshea et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0034905 A1 | 2/2003 | Anton et al. |
| 2003/0051045 A1 | 3/2003 | Connor |
| 2003/0055723 A1 | 3/2003 | English |
| 2003/0074301 A1 | 4/2003 | Solomon |
| 2003/0105846 A1 | 6/2003 | Zhao et al. |
| 2003/0108000 A1 | 6/2003 | Chaney et al. |
| 2003/0108002 A1 | 6/2003 | Chaney et al. |
| 2003/0128708 A1 | 7/2003 | Inoue et al. |
| 2003/0130945 A1 | 7/2003 | Force |
| 2003/0139934 A1 | 7/2003 | Mandera |
| 2003/0156586 A1 | 8/2003 | Lee et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0212954 A1 | 11/2003 | Patrudu |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0122926 A1 | 6/2004 | Moore et al. |
| 2004/0123277 A1 | 6/2004 | Schrader et al. |
| 2004/0133605 A1 | 7/2004 | Chang et al. |

(56) References Cited

U.S. PATENT DOCUMENTS

| | | |
|---|---|---|
| 2004/0138858 A1 | 7/2004 | Carley |
| 2004/0167967 A1 | 8/2004 | Bastian et al. |
| 2004/0177165 A1 | 9/2004 | Masputra et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2005/0008017 A1 | 1/2005 | Datta et al. |
| 2005/0021703 A1 | 1/2005 | Cherry et al. |
| 2005/0027841 A1 | 2/2005 | Rolfe |
| 2005/0044158 A1 | 2/2005 | Malik |
| 2005/0117589 A1 | 6/2005 | Douady et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2005/0273456 A1 | 12/2005 | Revanuru et al. |
| 2006/0031374 A1 | 2/2006 | Lu et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0100752 A1 | 5/2006 | Kim et al. |
| 2006/0112367 A1 | 5/2006 | Harris |
| 2006/0123210 A1 | 6/2006 | Pritchett et al. |
| 2006/0130133 A1 | 6/2006 | Andreev et al. |
| 2006/0133374 A1 | 6/2006 | Sekiguchi |
| 2006/0140193 A1 | 6/2006 | Kakani et al. |
| 2006/0153201 A1 | 7/2006 | Hepper et al. |
| 2006/0209669 A1 | 9/2006 | Nishio |
| 2006/0229861 A1 | 10/2006 | Tatsuoka et al. |
| 2006/0235998 A1 | 10/2006 | Stecher et al. |
| 2006/0259320 A1 | 11/2006 | LaSalle et al. |
| 2006/0268692 A1 | 11/2006 | Wright et al. |
| 2006/0270341 A1 | 11/2006 | Kim et al. |
| 2006/0282442 A1 | 12/2006 | Lennon et al. |
| 2007/0005807 A1 | 1/2007 | Wong |
| 2007/0016613 A1 | 1/2007 | Foresti et al. |
| 2007/0019636 A1 | 1/2007 | Lau et al. |
| 2007/0038994 A1 | 2/2007 | Davis et al. |
| 2007/0067771 A1 | 3/2007 | Kulbak et al. |
| 2007/0112775 A1 | 5/2007 | Ackerman |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0147246 A1 | 6/2007 | Hurley et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0192543 A1 | 8/2007 | Naik et al. |
| 2007/0233826 A1 | 10/2007 | Tindal et al. |
| 2007/0250560 A1 | 10/2007 | Wein et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0120592 A1 | 5/2008 | Tanguay et al. |
| 2008/0141246 A1 | 6/2008 | Kuck et al. |
| 2008/0208917 A1 | 8/2008 | Smoot et al. |
| 2008/0263401 A1 | 10/2008 | Stenzel |
| 2008/0270578 A1 | 10/2008 | Zhang et al. |
| 2008/0281908 A1 | 11/2008 | McCanne et al. |
| 2008/0281944 A1 | 11/2008 | Vorne et al. |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0097480 A1 | 4/2009 | Curtis et al. |
| 2009/0106413 A1 | 4/2009 | Salo et al. |
| 2009/0125955 A1 | 5/2009 | DeLorme |
| 2009/0138314 A1 | 5/2009 | Bruce |
| 2009/0161542 A1 | 6/2009 | Ho |
| 2009/0187915 A1 | 7/2009 | Chew et al. |
| 2009/0217163 A1 | 8/2009 | Jaroker |
| 2009/0217386 A1 | 8/2009 | Schneider |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0289828 A1 | 11/2009 | Hinchey |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0093318 A1 | 4/2010 | Zhu et al. |
| 2010/0131654 A1 | 5/2010 | Malakapalli et al. |
| 2010/0179984 A1 | 7/2010 | Sebastian |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0274772 A1 | 10/2010 | Samuels |
| 2010/0306169 A1 | 12/2010 | Pishevar et al. |
| 2011/0055921 A1 | 3/2011 | Narayanaswamy et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0098087 A1 | 4/2011 | Tseng |
| 2011/0113095 A1 | 5/2011 | Hatami-Hanza |
| 2011/0153985 A1* | 6/2011 | Saha .................... G06F 21/602 712/42 |
| 2011/0185082 A1 | 7/2011 | Thompson |
| 2011/0188415 A1 | 8/2011 | Graziano |
| 2011/0213911 A1 | 9/2011 | Eldus et al. |
| 2012/0117028 A1 | 5/2012 | Gold et al. |
| 2012/0150805 A1 | 6/2012 | Pafumi et al. |
| 2012/0195273 A1 | 8/2012 | Iwamura et al. |
| 2012/0254293 A1 | 10/2012 | Winter et al. |
| 2012/0257506 A1 | 10/2012 | Bazlamacci et al. |
| 2012/0258766 A1 | 10/2012 | Cho et al. |
| 2013/0058229 A1 | 3/2013 | Casado et al. |
| 2013/0182713 A1 | 7/2013 | Giacomoni et al. |
| 2013/0238472 A1 | 9/2013 | Fan et al. |
| 2014/0071895 A1 | 3/2014 | Bane et al. |
| 2014/0099945 A1 | 4/2014 | Singh et al. |
| 2014/0105069 A1 | 4/2014 | Potnuru |
| 2014/0187199 A1 | 7/2014 | Yan et al. |
| 2014/0286316 A1 | 9/2014 | Park et al. |
| 2015/0058595 A1 | 2/2015 | Gura et al. |

FOREIGN PATENT DOCUMENTS

| | | |
|---|---|---|
| EP | 1081918 A2 | 8/2000 |
| JP | 6205006 A3 | 7/1994 |
| JP | 821924 B2 | 3/1996 |
| JP | 2000183935 A3 | 6/2000 |
| WO | 0058870 | 3/2000 |
| WO | 0239696 A2 | 5/2002 |
| WO | 2006091040 A1 | 8/2006 |

OTHER PUBLICATIONS

Blue Coat, "Technology Primer: CIFS Protocol Optimization," Blue Coat Systems Inc., 2007, last accessed: Dec. 9, 2013, pp. 1-3, (http://www.bluecoat.com).

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

F5 Networks Inc., "Big-IP® Reference Guide, version 4.5", F5 Networks Inc., Sep. 2002, pp. 11-1-11-32, Seattle, Washington.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Using F5's-DNS Controller to Provide High Availability Between Two or More Data Centers", F5 Networks

(56) References Cited

OTHER PUBLICATIONS

Inc., Aug. 2001, pp. 1-4, Seattle, Washington, (http://www.f5.com/f5products/3dns/relatedMaterials/3DNSRouting.html).
F5 Networks Inc., "Deploying the BIG-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Case Information Log for 'Issues with BoNY upgrade to 4.3'", as early as Feb. 2008.
F5 Networks Inc., "F5 WANJet CIFS Acceleration", White Paper, F5 Networks Inc., Mar. 2006, pp. 1-5, Seattle, Washington.
Fajardo V., "Open Diameter Software Architecture," Jun. 25, 2004, pp. 1-6, Version 1.0.7.
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.
Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Internet Protocol,"Darpa Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, (http://news.com).
LaMonica M., "Infravio spiffs up Web services registry idea", CNET News.com, May 11, 2004, pp. 1-2, (http://www.news.com).
MacVittie, Lori, "Message-Based Load Balancing," Technical Brief, Jan. 2010, pp. 1-9, F5 Networks, Inc.
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/ProdMgmt/MarketResearch/Unisversal).
Modiano E., "Scheduling Algorithms for Message Transmission Over a Satellite Broadcast System," MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Ott D., et al., "A Mechanism for TCP-Friendly Transport-level Protocol Coordination", USENIX Annual Technical Conference, Jun. 10, 2002, University of North Carolina at Chapel Hill, pp. 1-12.
Padmanabhan V., et al., "Using Predictive Prefetching to Improve World Wide Web Latency", SIGCOM, Jul. 1, 1996, pp. 1-15.
"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).
Rosen E., et al., "MPLS Label Stack Encoding", (RFC:3032) Network Working Group, Jan. 2001, pp. 1-22, (http://www.ietf.org/rfc/rfc3032.txt).
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, (http://www.adtmag.com).
Shohoud, Y., "Building XML Web Services with VB .NET and VB 6", Addison Wesley, Sep. 2002, pp. 1-14.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
"UDDI Overview", Sep. 6, 2000, pp. 1-21, uddi.org, (http://www.uddi.org/).
"UDDI Version 3.0.1", UDDI Spec Technical Committee Specification, Oct. 14, 2003, pp. 1-383, uddi.org, (http://www.uddi.org/).
"UDDI Technical White Paper," Sep. 6, 2000, pp. 1-12, uddi-org, (http://www.uddi.org/).
Wang B., "Priority and realtime data transfer over the best-effort Internet", Dissertation Abstract, ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

METHODS FOR PROVISIONING APPLICATION DELIVERY SERVICE AND DEVICES THEREOF

CROSS-REFERENCE TO RELATED APPLICATIONS

The present application claims the benefit of priority based on U.S. Provisional Patent Application Ser. No. 61/723,617, filed on Nov. 7, 2012, entitled "Methods for Provisioning Application Delivery Service and Devices Thereof", which is hereby incorporated by reference in its entirety.

FIELD

This technology relates to application management, and particularly to methods for provisioning application delivery service and devices thereof.

BACKGROUND

Provisioning application delivery services including simple load balancing often requires external management framework for provisioning. Existing technologies include extensive development work using interfaces which requires manual intervention for provisioning application delivery services. Additionally, the system programmers or administrators within the organization often may not have the resources or skill sets necessary to perform such provisioning in a fully automated manner.

Further, in existing technologies, portability across environments is inhibited by an over-reliance on hypervisor and virtualization-based nascent specifications such as OVF as instructions could be written in different languages which could not be understood by all the system administrators and programmers. These specifications are slow to emerge and do not fully address the basic problem of automating a simple provisioning process in a heterogeneous environment because they fail to encapsulate even primitive application delivery service descriptions.

SUMMARY

Figure 1:
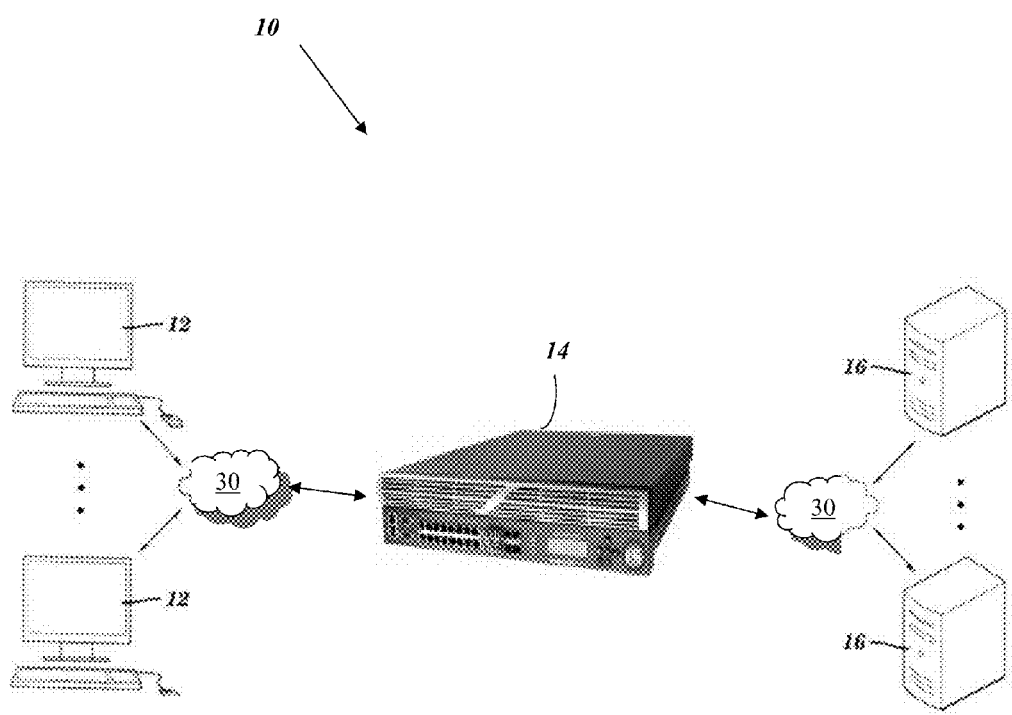
FIG. 1 is an exemplary environment which comprises an application delivery controller for provisioning application delivery service.

A method for provisioning application delivery service includes an application delivery controller for receiving a notification from a client computing device when an application is selected. A configuration file including one or more new instructions is identified by the application delivery controller from one or more memory locations. One or more existing instructions within the application delivery controller is updated by the application delivery controller with the one or more new instructions present within the identified configuration file to provision the selected application. The selected application is provisioned to the requesting client computing device by the application delivery controller using the updated one or more new instructions.

A non-transitory computer readable medium having stored thereon instructions for provisioning application delivery service comprising machine executable code which when executed by at least one processor, causes the processor to perform steps including receiving a notification from a client computing device when an application is selected. A configuration file including one or more new instructions is identified from one or more memory locations. One or more existing instructions within the application delivery controller is updated with the one or more instructions present within the identified configuration file to provision the selected application. The selected application is provisioned to the requesting client computing device using the updated one or new more instructions.

An application delivery controller comprising at least one of configurable hardware logic configured to be capable of implementing or a processor coupled to a memory and configured to execute programmed instructions stored in the memory including receiving a notification from a client computing device when an application is selected. A configuration file including one or more new instructions is identified from one or more memory locations. One or more existing instructions within the application delivery controller is updated with the one or more new instructions present within the identified configuration file to provision the selected application. The selected application is provisioned to the requesting client computing device using the updated one or more new instructions.

This technology provides a number of advantages including providing more effective methods, non-transitory computer readable medium and devices for provisioning application delivery services. By provisioning applications using configuration files, technology disclosed herein provides advantages of providing applications to client computing devices via platform as a service (PaaS) or infrastructure as a service (IaaS). Additionally, generating new configuration files dynamically also provides the flexibility to the network administrators or developers to effectively manage provisioning of applications. Furthermore, provisioning application using configuration file removes the need for external configuration scripts and dependencies as well as reducing the integration work required to automate the process.

DETAILED DESCRIPTION

An exemplary network environment 10 with client computing devices 12, an application delivery controller 14 and server computing devices 16 is illustrated in FIG. 1. In this example, the client computing devices 12, the application delivery controller 14 and server computing devices 16 are coupled together by communication network 30, although other types and numbers of systems, devices, components and other elements in other configurations which are coupled together in other manners can be used. This technology provides a number of advantages including methods, non-transitory computer readable medium, and apparatus that facilitate provisioning of application delivery services.

Referring more specifically to FIG. 1, application delivery controller is coupled to the client computing devices 12 by the communication network 30 such as Local Area Network (LAN) or Wide Area Network (WAN). In this example, the application delivery controller is further coupled to the server computing devices 16 by the communication network 30. Other network devices configured to generate, send, and receive network communications and coupled together via other topologies can also be used. While not shown, the environment 10 also may include additional network components, such as routers, switches and other devices, which are well known to those of ordinary skill in the art and thus will not be described here.

Figure 2:
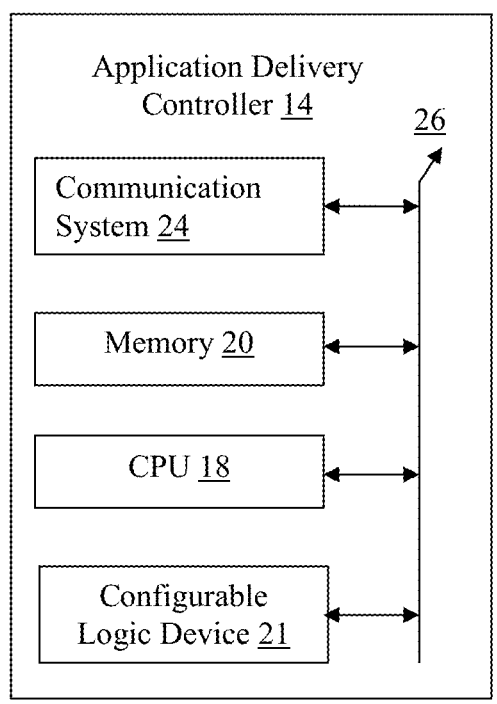
FIG. 2 is an exemplary block diagram illustrating the application delivery controller.

The application delivery controller 14 may perform any number of functions, such as monitoring, optimizing, securing, load balancing and accelerating the network traffic between the client computing devices 12 and the server computing devices 16. Referring to FIG. 2, in this example, application delivery controller 14 includes at least one processor or a central processing unit 18, memory 20, optional configurable logic device 21 and a communication system 24, which are coupled together by a bus 26, although the application delivery controller 14 may include other types and numbers of elements in other configurations such as an input device and a display device. In this example, the bus 26 is a hyper-transport bus, although other bus types and links may be used, such as PCI.

The processor 18 in the application delivery controller 14 executes a program of stored instructions for one or more aspects of the present technology as described and illustrated by way of the examples herein, although other types and numbers of processing devices and logic could be used and the processor 18 could execute other numbers and types of programmed instructions. The processor 18 of the application delivery controller 14 may comprise one or more central processing units or general purpose processors with one or more processing cores, such as AMD® processor(s), although other types of processor(s) could be used (e.g., Intel®).

Figure 3:
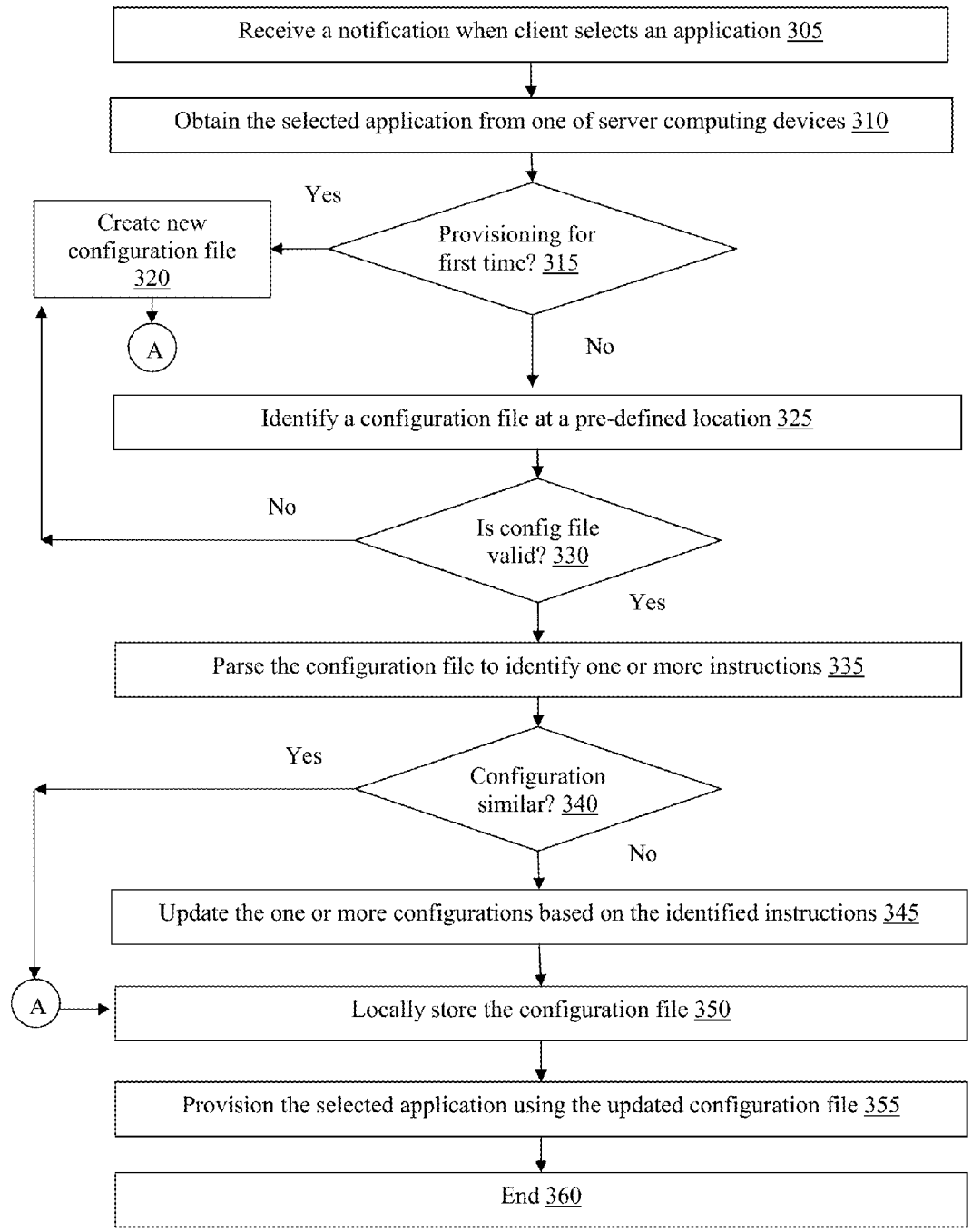
FIG. 3 is a flowchart of an exemplary method for provisioning application delivery service.

The memory 20 of the application delivery controller 14 stores these programmed instructions for one or more aspects of the present technology as described in FIG. 3 and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18 in the application delivery controller 14, can be used for the memory in the application delivery controller 14.

The optional configurable logic device 21 of the application delivery controller 14 may comprise specialized hardware configured to implement one or more steps of this technology as illustrated and described with reference to the examples herein. By way of example only, the configurable logic device 21 may comprise one or more of field programmable gate arrays (FPGAs), field programmable logic devices (FPLDs), application specific integrated circuits (ASICs) and/or programmable logic units (PLUs).

The communication system 24 in the application delivery controller 14 is used to operatively couple and communicate between the application delivery controller 14, the client computing devices 12, and the servers 16 which are all coupled together via the communications network 30, although other types and numbers of systems, devices, or elements and other types and numbers of communication networks or systems with other types and numbers of connections and configurations can be used. By way of example only, the one or more the communications networks can use TCP/IP over Ethernet and industry-standard protocols, including NFS, CIFS, SOAP, XML, LDAP, and SNMP, although other types and numbers of communication networks, such as a direct connection, a local area network (LAN), a wide area network (WAN), modems and phone lines, e-mail, and wireless communication technology, each having their own communications protocols, can be used. Communication network 30 such as LAN in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. Additionally, communication network 30 such as WAN in this example may comprise any wide area network (e.g., Internet), although any other type of traffic network topology may be used.

Each of the client computing devices 12 and server computing devices 16 includes a processor, a memory, and an input device, output device, which are coupled together by a bus or other link, although other numbers and types of network devices could be used. The client computing devices 12 may run interface application(s), such as a Web browser, that may provide an interface to make requests for and receive content and/or communicate with web applications stored on one or more of the server computing devices 16 via the communication network 30.

Generally, the server computing devices 16 process requests received from requesting client computing devices 12 via the communication network 30 according to the HTTP-based application RFC protocol or the CIFS or NFS protocol for example. Various network processing applications, such as CIFS applications, NFS applications, HTTP Web Server applications, and/or FTP applications, may be operating on the server computing devices 16 and transmitting content (e.g., files, Web pages) to the client computing devices 12 in response to requests for the content from the client computing devices 12.

Although an exemplary network environment 10 with the client computing device 12, application delivery controller 14, server computing device 16 and communication network 30 are described in FIGS. 1-3 and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein. An example of a method for provisioning application delivery services will be described herein with reference to FIGS. 1-3.

Referring more specifically to FIG. 3, in step 305 the application delivery controller 14 receives a notification to provision an application when a client computing device 12 selects the application from a list of one or more applications, although the application delivery controller 14 may receive other types and amounts of notifications and other information when the client computing device 12 selects an application. By way of example only, the application delivery controller 14 may also receive an internet protocol address (IP address) of a configuration file associated with the selected application along with the notification.

In step 310, in response to the received notification the application delivery controller 14 obtains the application to be provisioned from the one of the server computing devices 16 hosting the application, although the application delivery controller 14 may obtain the application to be provisioned from other locations.

In step 315, the application delivery controller 14 determines if the selected application is being provisioned for the first time. By way of example only, memory 20 of the application delivery controller 14 can include a list of all of the applications and the number of times each of the application has been previously provisioned. In this example, application delivery controller 14 determines if the application is being provisioned based on the information present within the list, although the application delivery controller 14 can use other techniques to determine if the selected application is being provisioned for the first time.

If in step 315 the application delivery controller 14 determines the application is being provisioned for the first time, then a Yes branch is taken to step 320. In step 320, the application delivery controller 14 assists with creating the configuration file in a format usable across one or more platforms or one or more infrastructures, although the configuration file can be created or obtained in other manners. By way of example only, the configuration file can be in form of a template which includes one or more instructions written in java script object notion (JSON) or extensible markup language, although the instructions can be written using any other known or standard languages. These instructions within the configurable file provide information or instructions to provision the application selected by the client computing device 12, although the instructions can provide other types of information to assist the application delivery controller 14 with provisioning of the selected application. By way of example only, the one or more instructions include provisioning the application using secure socket layer (SSL) or compressing all the images within the application prior to provisioning the application, although other types and numbers of instructions can be included in the configuration file. Once the configuration file is created by the application delivery controller, the exemplary flow proceeds to step 350.

If back in step 315 the application delivery controller determines the application is not being provisioned for the first time, then a No branch is taken to step 325. In step 325, the application delivery controller 14 identifies a configuration file associated with the selected application stored at a predefined location based on the received IP address of the configuration file, although the application delivery controller can identify the configuration file based on other types and numbers of parameters.

For example, the application delivery controller 14 could identify the configuration file based on information present within a stored table in memory in the application delivery controller 14 or retrieved from another storage location. By way of example only, the table could include a list of applications and their associated address for the pre-defined location having the configuration file, although the table can include other amounts of information to assist the application delivery controller 14 to quickly and effectively identify the pre-defined location containing the configuration file.

In another example, a single application could have multiple configuration files which could be stored at multiple pre-defined locations and the application delivery controller 14 identifies the appropriate configuration file based on one or more parameters, such as location of the client computing device 12 which selected the application or type of user using the client computing device 12, although other types and numbers of factors could be considered to identify the predefined location.

Alternatively, in another example, the application delivery controller 14 may receive at least one part of the configuration file along with the notification when the client computing device 12 selects an application. Additionally, in yet another example, the application delivery controller 14 may receive at least a part of the configuration file, the address of the other parts of the configured file stored at a pre-defined location along with the notification when the client computing device 12 selects an application.

Further, in yet another example, the application delivery controller 14 can identify the appropriate configuration file of multiple configuration files stored at multiple locations for the selected application by combining one part of the IP address received along with the notification along with the information present within the table.

Next in step 330, the application delivery controller 14 determines if the identified configuration file is valid. By way of example only, the application delivery controller determines the validity of the configuration file by checking if the instructions within the identified configuration file is written in java script object notion (JSON) or extensible markup language, although the application delivery controller 14 can determine the validity of the configuration file using other techniques. As previously illustrated in this example, the configuration file can be in form of a template which includes one or more instructions written in java script object notion (JSON) or extensible markup language, although the instructions can be written using any other known or standard languages. These instructions within the configurable file provide information or instructions to provision the application selected by the client computing device 12, although the instructions can provide other types of information to assist the application delivery controller 14 with provisioning of the selected application. If the application delivery controller 14 determines that the identified configuration file is not valid, then a No branch is taken back to step 320 to create a new configuration file as previously illustrated.

If back in step 320, the application delivery controller 14 determines the configuration file is valid, then a Yes branch is taken to step 335. In step 335, the application delivery controller 14 parses the identified configuration file to identify one or more instructions. In this example, the application delivery controller 14 identifies one or more instructions in the configuration file based on tags, labels or common names present within the configuration file, although the application delivery controller 14 can identify one or more instructions in the configuration file using other methods or techniques. By way of example only, the identified one or more instructions may include instructions for provisioning the application using secure socket layer (SSL) or compressing all the images within the application prior to provisioning the application, although other types and amounts of instructions can be included in the configuration file. In another example, the one or more identified instructions may relate to updating or reconfiguration the settings of the selected application.

Next in step 340, the application delivery controller determines 14 if the existing set of one or more instructions stored within the memory 20 of the application delivery controller 14 is the same to the identified one or more new instructions in the configuration file. By way of example only, the application delivery controller 14 compares values each of the existing set of instructions stored within the memory 20 with the corresponding values of the instruction identified in the configuration file. In this example, when the values of each of the existing set of instructions exactly match with the corresponding values of the one or more new instructions identified in the configuration file, the comparison is determined to be the same, although the application delivery controller 14 can determine the similarity using other methods or techniques. In another example, the application delivery controller 14 can compare the existing set of one or more instructions and the one or more new instructions to check if the number of matches between the existing set of one or more instructions and the one or more new instructions is equal to or greater than a pre-defined threshold number. If the application delivery controller 14 determines that each of the existing set of one or more instructions is the same to identify one or more new instructions, then a Yes branch is taken to step 350. However, if the application delivery controller 14 determines that at least one of the configurations is not the same to the identified one or more new instructions, then a No branch is taken to step 345.

In step 345, the application delivery controller 14 updates the existing set of one or more instructions internally stored in memory 20 by replacing the existing set of one or more instructions with the one or more identified one or more new instructions, although the application delivery controller 14 can only update the existing set of instruction which was not the same to the identified one or more new instructions. Additionally in this example, the application delivery controller 14 may store the existing set of one or more instructions separately for any other purpose.

Next in step 350, the application delivery controller 14 stores the identified configuration file with the identified instructions locally within the memory 20 of the application delivery controller 14, although the application delivery controller 14 can store the configuration file at any other location.

In step 355, the application delivery controller 14 provisions the application selected by the client computing device 12 using the one or more identified instructions within the stored configuration file and exemplary process ends in step 360. Alternatively, prior to provisioning of the selected application, the application delivery controller 14 can configure or update one or more settings of the application using the identified instructions within the configuration file. By way of example only, the application delivery controller can modify the list of features in the application or block restricted content within the application, although the application delivery controller 14 can change other types of settings within the application using the instructions present within the identified configuration file. By configuring the settings within the application, the technology disclosed provides benefits of provisioning the application customized for the type of the requesting client computing device 12 or type of user using the requesting client computing device 12.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for provisioning an application, the method comprising:
    receiving, by an application delivery controller, a notification from a client computing device when an application is selected;
    automatically identifying, by the application delivery controller, one of a plurality of configuration files corresponding to the selected application based on one or more parameters associated with the client computing device or a user of the client computing device, the one of the configurations files comprising one or more new instructions defining one or more aspects of provisioning the selected application to the client computing device;
    updating, by the application delivery controller, one or more stored instructions based on the one or more new instructions in the one of the configurations files based on a comparison of the one or more stored instructions to the one or more new instructions; and
    provisioning, by the application delivery controller, the selected application to the client computing device using the updated stored instructions.

2. The method as set forth in claim 1 wherein the identifying further comprises identifying the one of the configuration files based on an Internet Protocol (IP) address included in the received notification.

3. The method as set forth in claim 1 further comprising parsing, by the application delivery controller, the one of the configuration files to identify the one or more new instructions.

4. The method as set forth in claim 1 further comprising updating, by the application delivery controller, one or more settings of the selected application based on the one or more new instructions within the one of the configuration files.

5. The method as set forth in claim 1 further comprising:
    receiving, by the application delivery controller, location information of the one of the configuration files from the selected application; and
    obtaining, by the application delivery controller, the one of the configuration files based on the received location information.

6. The method as set forth in claim 1 wherein the receiving further comprises receiving at least one part of the one of the configuration files with the notification, and the method further comprises:
    obtaining, by the application delivery controller, any remaining parts of the one of the configuration files; and updating, by the application delivery controller, the one or more stored instructions based on the received at least one part of the one of the configuration files and the any remaining parts of the one of the configuration files.

7. The method as set forth in claim 1 wherein the one of the configuration files is in a format that is usable across one or more frameworks, usable across one or more platforms, or configurable by one or more administrators.

8. A non-transitory computer readable medium having stored thereon instructions for provisioning an application comprising machine executable code which when executed by at least one processor, causes the processor to perform steps comprising:
   receiving a notification from a client computing device when an application is selected;
   automatically identifying one of a plurality of configuration files corresponding to the selected application based on one or more parameters associated with the client computing device or a user of the client computing device, the one of the configurations files comprising one or more new instructions defining one or more aspects of provisioning the selected application to the client computing device;
   updating one or more stored instructions based on the one or more new instructions in the one of the configurations files based on a comparison of the one or more stored instructions to the one or more new instructions; and
   provisioning the selected application to the client computing device using the updated stored instructions.

9. The medium as set forth in claim 8 wherein the identifying further comprises identifying the one of the configuration files based on an Internet Protocol (IP) address included in the received notification.

10. The medium as set forth in claim 8 wherein the machine executable code, when executed by the processor, further causes the processor to perform one or more additional steps comprising parsing the one of the configuration files to identify the one or more new instructions.

11. The medium as set forth in claim 8 wherein the machine executable code, when executed by the processor, further causes the processor to perform one or more additional steps comprising updating one or more settings of the selected application based on the one or more new instructions within the one of the configuration files.

12. The medium as set forth in claim 8 wherein the machine executable code, when executed by the processor, further causes the processor to perform one or more additional steps comprising:
   receiving location information of the one of the configuration files from the selected application; and
   obtaining the one of the configuration files based on the received location information.

13. The medium as set forth in claim 8 wherein the receiving further comprises receiving at least one part of the one of the configuration files with the notification, and the \machine executable code, when executed by the processor, further causes the processor to perform one or more additional steps comprising:
   obtaining any remaining parts of the one of the configuration files; and
   updating the one or more stored instructions based on the received at least one part of the one of the configuration files and the any remaining parts of the one of the configuration files.

14. The medium as set forth in claim 8 wherein the one of the configuration files is in a format that is usable across one or more frameworks, usable across one or more platforms, or configurable by one or more administrators.

15. An application delivery controller device comprising a memory comprising programmed instructions stored in the memory and one or more processors coupled to the memory and configured to be capable of executing the programmed instructions stored in the memory to:
   receive a notification from a client computing device when an application is selected;
   automatically identify one of a plurality of configuration files corresponding to the selected application based on one or more parameters associated with the client computing device or a user of the client computing device, the one of the configurations files comprising one or more new instructions defining one or more aspects of provisioning the selected application to the client computing device;
   update one or more stored instructions based on the one or more new instructions in the one of the configurations files based on a comparison of the one or more stored instructions to the one or more new instructions; and
   provision the selected application to the client computing device using the updated stored instructions.

16. The device as set forth in claim 15 wherein the one or more processors are further configured to be capable of executing the programmed instructions stored in the memory to identify the one of the configuration files based on an Internet Protocol (IP) address included in the received notification.

17. The device as set forth in claim 15 wherein the one or more processors are further configured to be capable of executing the programmed instructions stored in the memory to parse a the one of the configuration files to identify the one or more new instructions.

18. The device as set forth in claim 15 wherein the one or more processors are further configured to be capable of executing the programmed instructions stored in the memory to update one or more settings of the selected application based on the one or more new instructions within the one of the configuration files.

19. The device as set forth in claim 15 wherein the one or more processors are further configured to be capable of executing the programmed instructions stored in the memory to:
   receive location information of the one of the configuration files from the selected application; and
   obtain the one of the configuration files based on the received location information.

20. The device as set forth in claim 15 wherein the one or more processors are further configured to be capable of executing the programmed instructions stored in the memory to:
   receive at least one part of the one of the configuration files with the notification;
   obtain any remaining parts of the one of the configuration files; and
   update the one or more stored instructions based on the received at least one part of the one of the configuration files and the any remaining parts of the one of the configuration files.

21. The device as set forth in claim 15 wherein the one of the configuration files is in a format that is usable across one or more frameworks, usable across one or more platforms, or configurable by one or more administrators.

\* \* \* \* \*